United States Patent [19]
Thadani

[11] 4,078,196
[45] Mar. 7, 1978

[54] DIGITAL VALVE AND PUMP CONTROL SYSTEM

[75] Inventor: Moti Thadani, Mt. Prospect, Ill.

[73] Assignee: Vapor Corporation, Chicago, Ill.

[21] Appl. No.: 662,459

[22] Filed: Mar. 1, 1976

[51] Int. Cl.² .................. G08C 15/06; G05B 11/32
[52] U.S. Cl. .................. 318/562; 340/163; 340/185; 361/191; 340/183
[58] Field of Search .......... 340/185, 186, 147 C, 340/147 CV, 147 PC, 163, 310 R, 310 A, 183; 343/225, 226; 318/562; 317/135 R, 154; 307/113, 115, 132 E, 132 EA; 361/191

[56] References Cited
U.S. PATENT DOCUMENTS

| | | | |
|---|---|---|---|
| 2,635,200 | 4/1953 | Berry | 317/135 R |
| 2,659,838 | 11/1953 | Rocher | 317/154 |
| 3,641,530 | 2/1972 | Schoenwitz | 340/183 |
| 3,793,636 | 2/1974 | Clark et al. | 340/183 |

*Primary Examiner*—Robert K. Schaefer
*Assistant Examiner*—Michael K. Mutter
*Attorney, Agent, or Firm*—Francis J. Lidd

[57] ABSTRACT

A control unit is connected, via a data bus, to a plurality of remote field controllers, each of which is in turn connected to a motor starter and status contacts of a respective valve or pump. Binary codes are communicated between the control unit and field controllers to convey status information, regarding a valve or pump, to the control unit. Likewise, command codes are conveyed from the control unit to a pump or valve to effect a selected operation.

12 Claims, 13 Drawing Figures

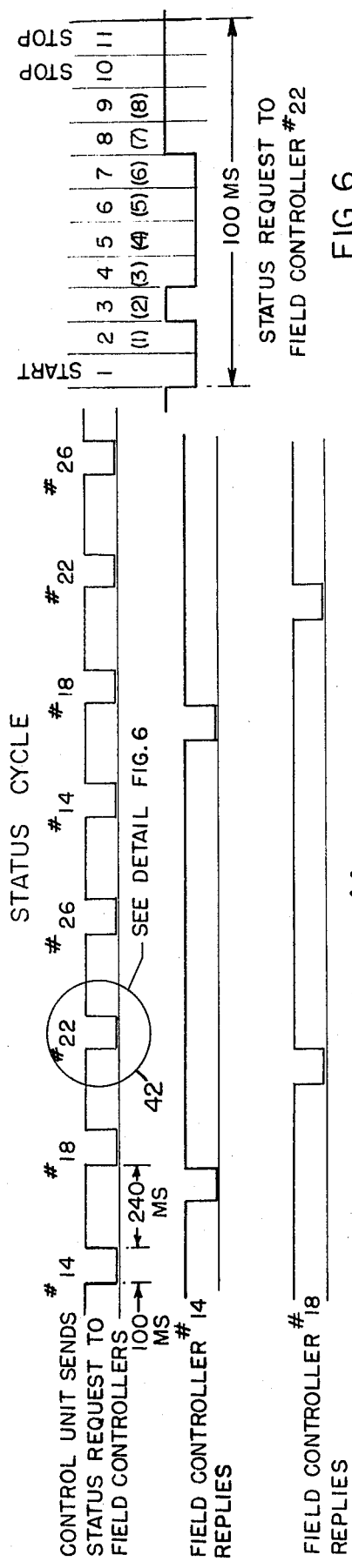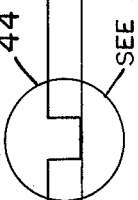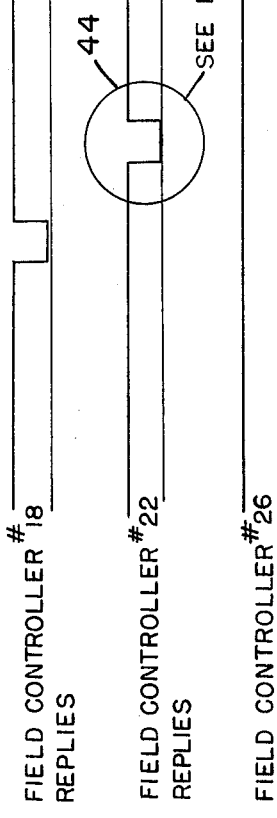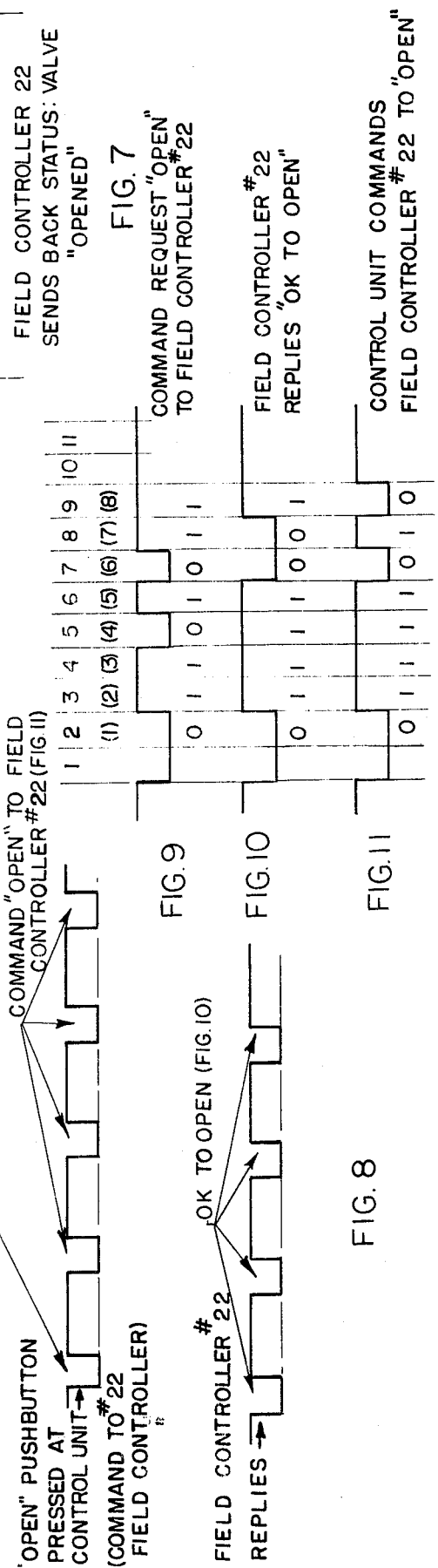

DIGITAL VALVE AND PUMP CONTROL SYSTEM

FIELD OF THE INVENTION

The present invention relates to valve and/or pump control systems, and more particularly to such a system that handles a plurality of valves and/or pumps located at a location remote from the control unit of the system.

BRIEF DESCRIPTION OF THE PRIOR ART

Valves and pumps are often positioned at a point remote from a control unit. The prior art typically utilizes up to three pairs of wires for displaying the status condition of valves and pumps as well as for transmitting command signals to such devices for operating them. Generally, three modes of operation are required for a valve system. These are open, close, and stop modes. In the case of a pump, two modes are required, namely, start and stop. In the case of valve control, the prior art approaches required a relatively high number of wires for achieving communication between a control unit and remotely situated valve controls. Clearly, this is expensive and decreases the reliability of a system. Further, in order to achieve three modes of operation, a relatively high number of relays had to be utilized as valve controls, at the remote location. Additional disadvantages of the prior art include the dependence of signal transmission on line conditions, which sometimes causes erroneous operations. Thus, at times, a particular operation is entered at a control unit but due to line conditions, no operation of a valve or pump occurs. At other times signals may be induced causing undesired operation of remote devices.

BRIEF DESCRIPTION OF THE PRESENT INVENTION

The present invention obviates the problems of the prior art by utilizing a digital system. The system includes a control unit which is connected to a plurality of remote field controllers, via a two-wire data bus. Each field controller in turn is connected to a respective pump or valve. The control unit is a supervisory device which is capable of indicating the status of a valve or pump. Further, it controls the action of such a device. It is to be noted that although the present invention is described in terms of valves or pumps, this is merely illustrative. Indeed, other contact actuated devices may be controlled by the system forming the present invention.

The control unit supervises the action of a number of remote field controllers over a two-wire loop or data bus. The present system may accommodate the three modes of valve operation without the necessity of using a relatively high number of wires to achieve signal communication. This is due to the fact that binary codes are utilized, in the present digital system, to achieve signal communication, over the data bus, which interconnects the field controllers.

Low level digital signals use standard DC signalling telegraph grade wires. A signal is not affected by line resistance (up to rated maximum). Due to the fact that the present invention utilizes digital circuitry, both the control unit and field controllers may employ reliable integrated circuitry, which can reject induced signals as erroneous codes and prevent undesired operations.

Security checks and message confirmation from the control unit are included as features of the present system. Further, failsafe features achieve failure display at the control unit so that they may be corrected.

Unique circuitry at the field controllers includes only two relays, for achieving three mode operation of valves and dual mode operation of pumps. This is in contrast to the prior art systems which required a minimum of three such relays.

Still further, it is possible for the present system to be included in a larger computer driven system which enables a computer to operate devices, in addition to manual controls of the same devices.

BRIEF DESCRIPTION OF THE FIGURES

The above-mentioned objects and advantages of the present invention will be more clearly understood when considered in conjunction with the accompanying drawings, in which:

FIG. 5 is a timing diagram of the status cycle for the present system.

FIG. 6 is a detail of the status cycle indicating the pulse train of a status request to a field controller.

FIG. 7 is a detail of the status cycle indicating the pulse train of a signal when the field controller sends back a status signal.

FIG. 8 is a timing diagram of a command cycle, for the present system.

FIG. 9 is a detail pulse train portion of the command cycle indicating a command request to a field controller.

FIG. 10 is a timing diagram of a command cycle, showing a field controller reply to the request of FIG. 9.

FIG. 11 is a detailed pulse train portion of the command cycle of a command from the control unit in response to the reply of FIG. 10.

DETAILED DESCRIPTION OF THE INVENTION

Figure 1:
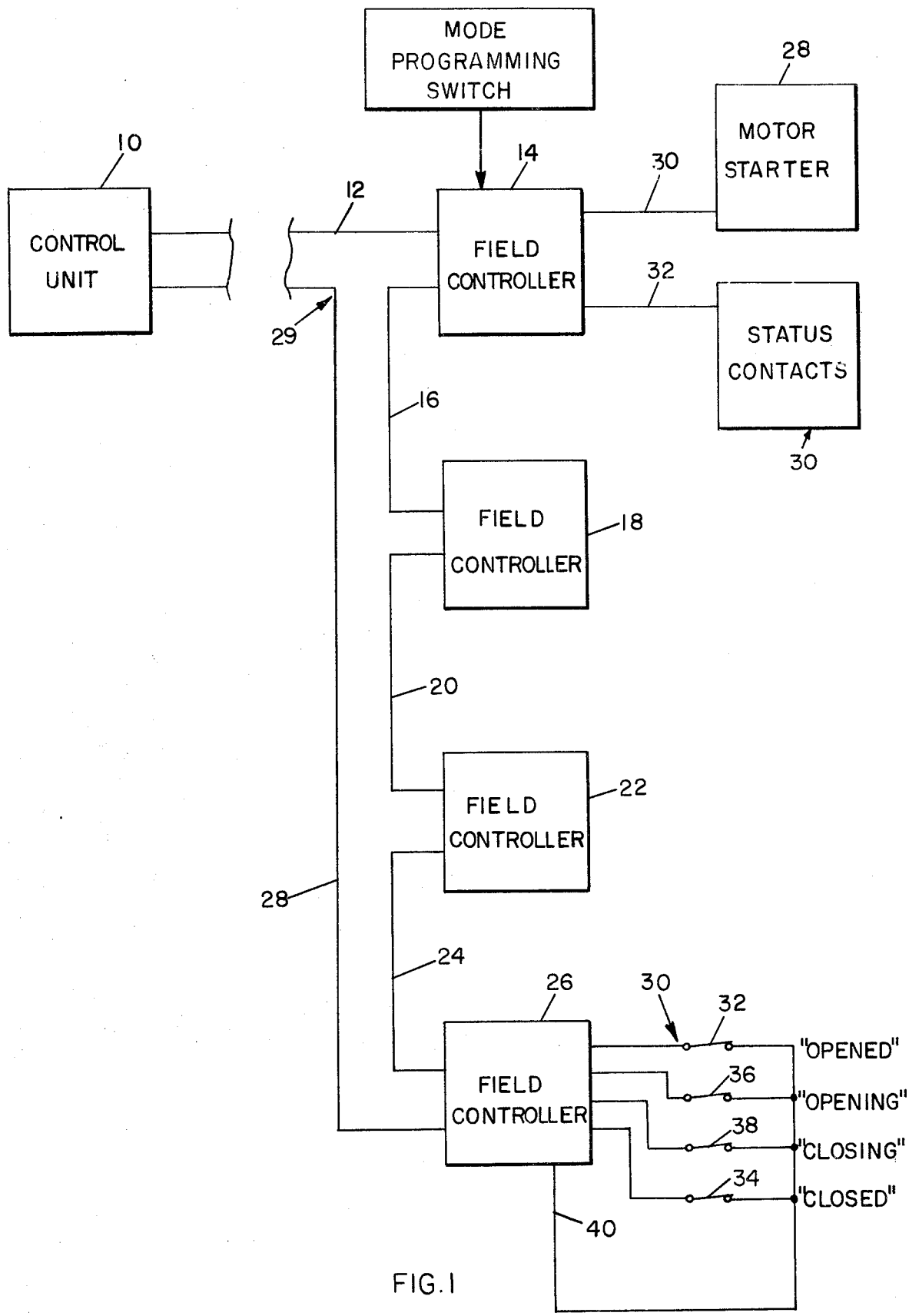
FIG. 1 is a system block diagram of the present invention.

Referring to the figures, and more particularly FIG. 1 thereof, a block diagram of the system forming the present invention is shown. The figure depicts control unit 10 that is connected in a series loop 29 with field controllers. A first section 12 of the loop is connected to a first input of field controller 14. The output of that controller is connected through loop section 16 to the input of field controller 18. The output of that controller is connected through an additional loop section 20 to an input of field controller 22. The output of the field controller 22 is connected, via loop section 24, to field controller 26. A final return section 28 completes the loop between the series connected field controllers and the control unit 10. The wire loop generally indicated by reference numeral 29 serves as a data bus for the system. Status information and command information is communicated between the control unit and the field controllers, on the single data bus. Although four field controllers have been shown, the system may be adapted for a lesser number.

Basically, the system operation includes two phases. The first is a status scan cycle, by the control unit 10, of the individual field controllers. The purpose of this is to determine the particular status of a pump or valve, at any moment in time. This is the usual phase for the system. Status contacts 30, such as limit switches 32, 34, 36 and 38, are appropriately connected to a valve or pump and provide electrical inputs to a corresponding field controller. The second basic phase is a command phase whereby the control unit conveys a command to a field controller to change the status of a particular valve or pump. In order to display the status of each field controller and hence its respective device, a control panel (not shown) may be included at the control unit. This control panel would include lighted indicators for each particular status of the field controllers. Push-button switches (not shown) may also be included on such a control panel for entering commands to the control unit. In a preferred embodiment of the invention, the push-button switches were combined with light displays, by utilizing lighted push-button switch actuators. When no push buttons actuate the system shown in FIG. 1, it remains in a status scan cycle. During this cycle, the control unit will sequentially send a Status Request message to each of the field controllers, each of which has a unique address. Only the addressed field controller sends back a signal containing the status information. After receipt of this status information, the control unit displays the status and then moves on to requesting the status of the next field controller. The status display is stored until updated on a subsequent cycle.

Other indications may be shown at the control unit. Although not shown, the display lights may indicate power loss at a field controller if all the lamps for a particular field controller are unlit. Further, an open signal line could be indicated if all displays, associated with the field controllers, remain unlit. A relay failure at a field controller could be indicated by having all the lights, for a particular field controller, remain lit. A final indication can be engineered for testing the lamp indicators (not shown) by requiring that all the indicator lights for the field controllers be lit upon actuation of a test switch.

As previously mentioned, commands at the control unit are entered on respective switches (not shown). When such a switch is activated, the status scan cycle is interrupted. The next message is sent to the field controller selected. This message is known as a Command Request signal. If, for example, a valve is to be opened, a respective switch is actuated at the control unit. The control unit which includes an encoder generates a coded message indicative of the desired operation. Thus, if a coded message Open Request is sent along with the address of field controller 14, on the data bus 29. All field controllers receive this message but only controller 14 replies. This field controller replies by sending back its address and the same Open Request information for verification. When the control unit 10 receives this message, it has confirmed the operational request and it sends a second Command Message which actually initiates the requested operation. The Command Message is decoded at the field controller 14.

Although the encoding and decoding, as well as other logic circuits of the control unit and field controllers are not shown, they are well known to those in the art. For example, the data bus approach utilized herein has been used in connection with peripheral device control for mini-computers. One example for this approach is the standard 20mA current loop interface to all mini-computers of Digital Equipment Corporation. It is the implementation of this concept, to valve and pump control circuitry, which is the invention. This of course requires circuit implementation, to be discussed hereinafter, which is different than other data processing applications of the data bus concept.

Figures 2, 3, 4:
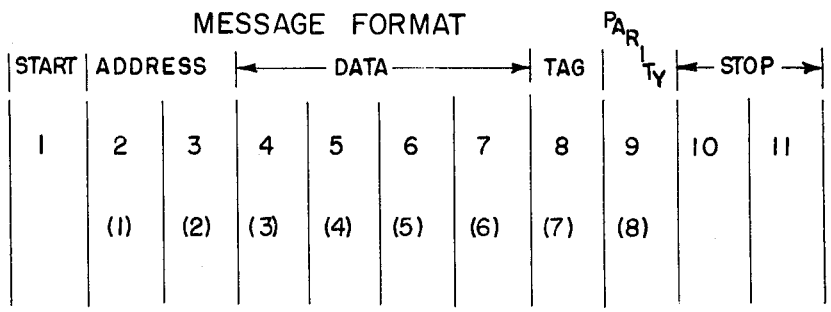
FIG. 2 is a message format as used in the communication between control unit and field controller, of the present system.
FIG. 3 is a code tabulation of communication from the control unit to a field controller.
FIG. 4 is a code tabulation of communication from the field controller to the control unit.

A digital message (serial data) is carried on the data bus 29 in a half-duplex manner. That is, either the control unit 10 is sending messages to the field controllers, or a particular field controller is sending its message to the control unit. The message is in the form of an 11-bit code as shown in FIG. 2. The first bit is a start bit and goes to 0 at the beginning of a message. The last two bits are stop bits. The middle bits 2 through 9 contain the data and are relabeled (1) through (8). The following discussion will pertain to the data bits labeled (1) through (8):

(1) + (2): Address bits (3) through (6): Status and Command information (7): Tag Bit wherein (7) = 1 for the control unit sending, (7) = 0 when a field controller is sending (8): odd parity check of a message, by the control unit.

The assignment of the various bit positions is clearly indicated in FIG. 2. Typically, each bit is 9.1 MS so that a full 11-bit message is approximately 100 MS long. However, this is merely illustrative.

Basic timing of the serial messages is governed by separate clocks (free-running multi-vibrators) located in the control unit 10, and in each of the field controllers. All of the multi-vibrators are set to operate at the same frequency but operation is asynchronous. Frequency of the multi-vibrators is 16 times the frequency of the bit message. That is, whereas the period of one bit of the 11-bit code is typically 9.1 MS, the corresponding clock period is $9.1/16 = 569$ microseconds (or, clock frequency $= 1/569 \times 10^{-6} = 1757$ CPS). The clock circuitry is well-known and the stability of oscillation is predictable.

FIG. 3 indicates, in tabular form, the data that control unit 10 transmits to the field controllers. It will be noticed that bits (1) and (2), which are the address bits, are indicated by X. This merely signifies that the address bits (1) and (2) may vary between binary 0 to binary 1, as indicated in the lower left corner of FIG. 4. These binary address codes respectively correspond to field controllers 14, 18, 22 and 26.

FIGS. 5-11 show the sequence of messages through the status cycle and command cycle. These may be considered in conjunction with the message codes of FIGS. 3 and 4. FIG. 5 shows the sequence of messages during the status cycle. The control unit 10 addresses each field controller in sequence, requesting status. On receipt, each field controller transmits back its status information which, if the address checks out, the control unit then displays. The display is stored until updated on the next cycle. Each status message interchange takes place within a short period of time, typically 340 MS and the entire four-field controller status cycles takes place in about 1.4 seconds.

The timing diagram of FIG. 5, which illustrates the status cycle includes the data in the form of pulse code modulation (PCM). Thus, within the single pulse width 42 (FIG. 5), modulation occurs as shown in FIG. 6. The modulation is a binary pulse train which is indicative of a status request to a field controller, by the control unit 10. The address bits (1) and (2) indicate binary 01, indicative of controller 22, as shown by the address codes, in the lower left corner of FIG. 4. The data bits (3)–(6) indicate the binary code 00001, indicative of a status request by the control unit, as seen on the top line of the tabulation of FIG. 3. The binary bit (7) is a tag bit and, since a status request is being made by the control unit 10, this bit will be binary 1, as shown in FIG. 3.

During the reply of field controller 22, as shown in FIG. 5, additional modulation occurs during the occurrence of the pulse 44. The detail for the modulation occurring during this pulse is shown in FIG. 7. As in the previous case, the address bits (1) and (2) are binary 01, indicative of field controller 22. The data occurring during bits (3)–(6) is the binary code 0010 which, for a valve, indicates that it is open, in accordance with the first line of the tabulation in FIG. 4. The tag bit (7) is binary 0 for all replies from the field controller to the control unit. In both FIGS. 6 and 7, the parity bit (8) is binary 1 so that odd parity is maintained.

FIG. 8 shows the sequence during a command cycle. As previously mentioned, actuation of a command switch (not shown) at the control unit 10 (FIG. 1) interrupts the status cycle. The message is sent immediately to the field controller addressed. The first message sent is a command request, for example, Command Request Open. On receipt of this message, the field controller addressed sends back the message OK to Open. The control unit 10 checks this message for address and correct command information and then, on the next cycle, sends the actual Command Open message on the data bus 29 (FIG. 1). On receipt of this message, the field controller energizes an "Open" relay, as will be discussed hereinafter in connection with FIG. 12, and a valve associated with the addressed field controller opens. If the "OK" message is not received from the field controller, the control unit continues to request control on subsequent messages, as long as a command switch is actuated at the control unit. Once the "OK" message is received, the control unit 10 continues to repeat the command message, again as long as a switch at the command unit 10 is actuated. The complete command cycle lasts about 440 MS.

An alternate mode of operation exists which provides for control of sequential open-close or stop-start commands. On actuation of an auxiliary switch, the field unit will latch on the first "open" or "close" command, so that a subsequent close or open command will not be accepted unless the latch is reset by receiving the stop command. This feature provides protection for valves, pumps or other equipment which do not tolerate rapid reversals of function or "plugging" action.

Although FIG. 8 shows the relative pulse dispositions during the aforementioned messages, FIGS. 9, 10 and 11 show the modulation occurring within the indicated pulses of FIG. 8, more specifically demonstrating the messages. Thus, FIG. 9 indicates the binary code for data bits (3)–(6) as 10101 which, as indicated in FIG. 3, is a command request to open a valve associated with the addressed field controller 22. In FIG. 10, the data is the binary code 1110 which, as indicated in FIG. 4, is a reply from the field controller that acceptable circuits are available to open the associated valve. In FIG. 11, the subsequent command from the control unit is indicated by the binary code 1110 which, as indicated in FIG. 3, is the command by the control unit 10, to the field controller 22, to open an associated valve. The tag bit (7) is shown, in FIGS. 9–11 to be a binary 0 or binary 1, depending upon whether the data flow is from the field controller or the control unit.

For a Stop command only, there is no message confirmation. The Stop message goes through immediately and both relays, to be discussed hereinafter, of an addressed field controller, are energized and the valve stops.

Although the preceding discussion regarding the timing diagrams and message formats have been explained in connection with a valve, it is to be understood that the explanation applies equally to a field controller that is associated with a pump. However, the operation for a pump is more simple. This is due to the fact that there are only two modes of operation for a pump motor. They are Start and Stop. The Start mode is analogous to the open mode for a valve. The Stop mode is the same for both the pump and valve. However, there is no close mode for a pump.

Figure 12:
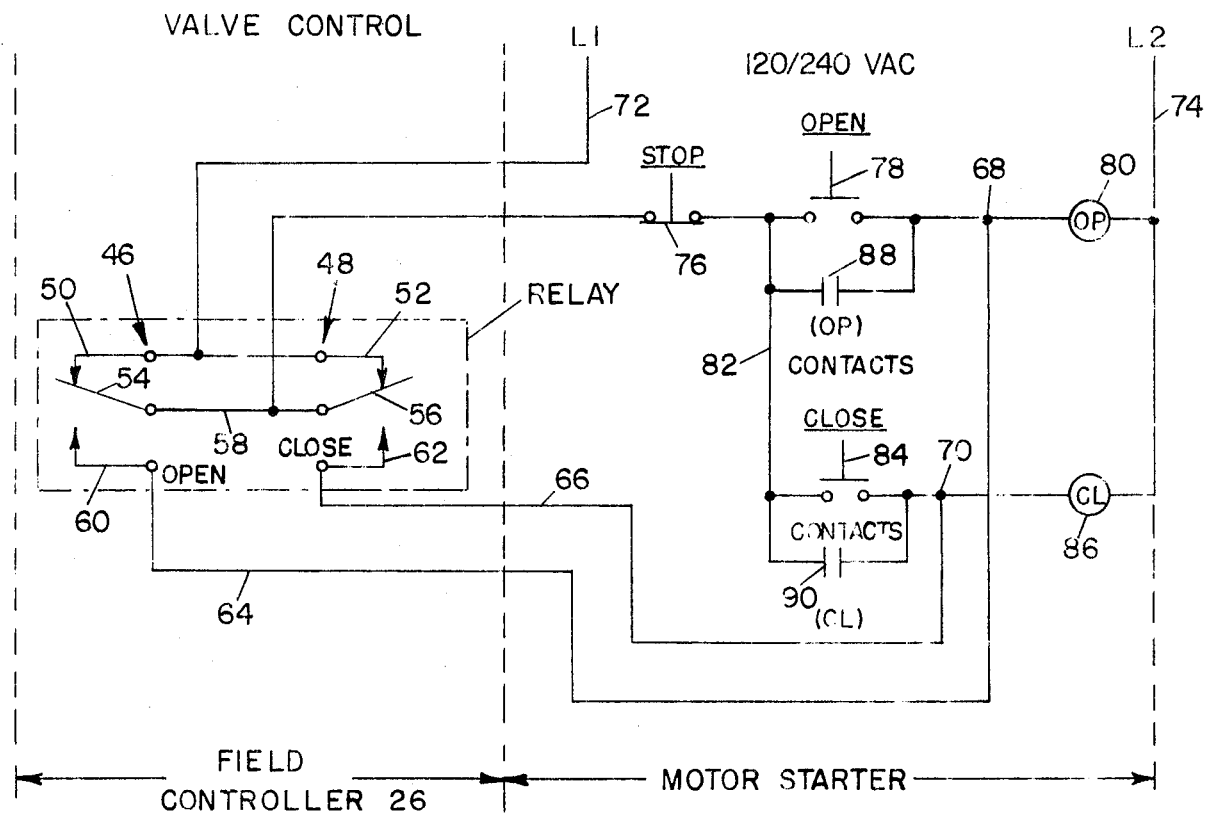
FIG. 12 is a schematic diagram of the interconnection of field controller relays to a motor starter for valve control.

FIG. 12 illustrates the actual circuit configuration between the relays of the field controller and a valve motor starter, connected to the output of the relays. The first relay is generally indicated by reference numeral 46 and a second relay is generally indicated by reference numeral 48. The relays are actuated by coils (not shown) that become energized from command decoders (not shown) located in the field controller. As previously mentioned, the decoders decode the command to perform either an open, close or stop function, which will be implemented by the relays 46 and 48. The first relay 46 includes a first contact 50 that is connected to the first contact 52 of relay 48. The wiper 54 of relay 46 is shown in its normally closed position as is the case with wiper 56 of relay 48. A second contact 60, of relay 46 is shown in its normally open position. Contact 62 of relay 48 is likewise shown in its normally open position. In the contact positions illustrated, there are no open, close or stop commands being transmitted to the valve motor starter. Thus, the valve motor starter is assumed to be in a pre-existing state. If a user wishes to initiate a particular operational mode for the motor starter, he may do so by actuating switches located at the motor starter location. Thus, if the valve is to be opened, the switch 78 is depressed thereby completing a circuit through the voltage line 72, contact 50, contact 52, wiper 54, wiper 56, closed stop switch 76, control coil 80, and finally line 74.

Similarly, if the valve is to be closed by a user at the motor starter location, the switch 84 is closed thereby completing a circuit between the lines 72 and 74, through the relays 46 and 48, in the state illustrated, and through the control coil 86. If the user wishes to stop the operation of the valve motor starter, the normally closed switch 76 is opened thereby opening the circuit between the lines 72 and 74.

If the field controller were to initiate an OPEN mode of operation, the wiper 54 is moved into contact with the contact 60. As a result of this relay condition, line voltage is applied, via line 64 and junction 68, across the control coil 80 thus causing closure of the control contacts 88, associated with coil 80. When the contacts 88 close, the coil 80 acts as a holding coil and ensures continued energization of itself, after the relay returns to its original, illustrated state after momentary actuation.

If, a CLOSE mode of operation is required, the field controller relay 48 changes its state so that the wiper 56 engages contact 62 and a path is completed between line 66 and junction 70, thereby completing holding energization of control coil 86, through the associated contacts 90. In this mode of operation, the coil 86 serves as a holding coil. If a third mode of operation, namely a STOP mode, is initiated by the field controller, the wipers 54 and 56 are caused to change their illustrated position and engage contacts 60 and 62, respectively. As a result, the circuits to the coils 80 and 86 are opened thus dropping out the respective contacts 88 and 90, thus stopping the valve.

Figure 13:
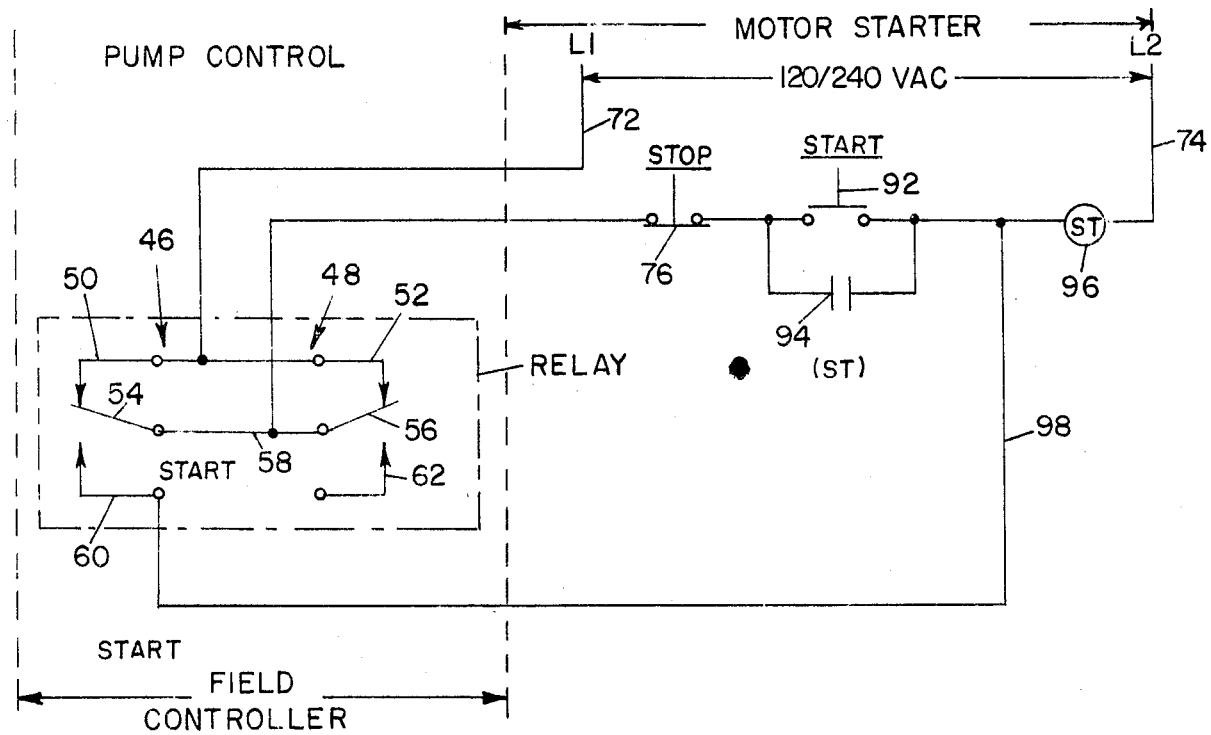
FIG. 13 is a schematic diagram of the interconnection of field controller relays to a motor starter for pump control.

FIG. 13 illustrates the electrical circuit for controlling a pump motor starter. As in the case of the valve control of FIG. 12, two relays are included in a field controller for controlling a pump motor starter. As previously mentioned, in the case of a pump, only two modes of operation are required; namely, Start and Stop. The relays and power lines are similarly numbered, as in the case of FIG. 12. If a start operation is to be initiated at the site of the pump, a locally available start switch 92 exists. By depressing the switch 92, a circuit is completed between the power line 72, relays 46, 48, the closed stop switch 76, the closed start switch 92, coil 96, and power line 74.

When a start operation is to be initiated by the field controller, a start switch 92 will be disposed in the illustrated open state as are the contacts 94. When the field controller initiates a START mode of operation, the wiper 54 of relay 46 moves to engagement with the contact 60. As a result, a circuit path is completed between the power lines 72, 74 and coil 96, via lead 98. The coil 96 serves as a holding coil and closes the contacts 94 so that continued energization of coil 96 results. Thus, only a momentary actuation of the START mode, by the field controller relay 46 is necessary to maintain that mode.

When the field controller initiates a STOP mode, the wipers 54 and 56 are moved downwardly into engagement with the contacts 60 and 62, as was the case in connection with FIG. 12. Opening contacts 54 and 56 cause a break in the circuit through the coil 96 and therefore the contacts 94 open to stop the pump motor starter.

To summarize the field controller relay operation, the following tabulation is offered:

| Mode | Field Controller Relay Operation | Action at Valve |
|---|---|---|
| OPEN | Relay 46 actuated | Valve Opens |
| CLOSE | Relay 48 actuated | Valve Closes |
| STOP | Both relays 46 and 48 actuated | Valve Stops |

In connection with pump operation, the following occurs:

| Mode | Field Controller Relay Operation | Action at Pump |
|---|---|---|
| START | Relay 46 actuated | Pump Starts |
| STOP | Both relays 46 and 48 actuated | Pump Stops |

Other special features may be incorporated in the system. Although the figures do not illustrate the following equipment, from the ensuing discussion, one of ordinary skill in the art may construct appropriate circuitry.

The field controller relays actually are two-pole relays. The first pole controls the output as previously shown in FIGS. 12 and 13. The second pole of each relay connects to a "failsafe" circuit which will respond to the condition if a relay contact is closed but there is no "command" signal present. This might be the case if the relay contact had become "stuck" closed or the output relay driver had failed "shorted". The circuit logic will respond to this condition by providing a "stop" signal calling for both relays to energize. Thus, even if one relay is erroneously energized, the other will now energize and, because of the "Stop" command, both relays will become energized and the output circuit will open (i.e., the valve will stop). In addition, a signal will be sent back to the control unit 10 which will light all lamp indicators of that station indicating relay failure.

Another feature is that of "plugging" and "non-plugging". Each field controller has a "mode" programming switch which sets operation as follows:

"Plugging" — Valve action will respond to "Close" command immediately after "Open" command and vice versa. That is, valve can be reversed without first command "Stop".

"Non-plugging" — Logic circuitry prevents reversing the valve until a "Stop" command is first given.

Internal logic turns off all indicator lamps of the station concerned in the event of loss of power at the field controller. Similarly, an open signal line will result in all indicator lamps off.

A separate pushbutton switch at the control unit allows all the indicator lamps to be tested. (Status cycle is momentarily interrupted during lamp test.)

As will be appreciated, the foregoing description relates to a system for indicating the status of a number of valves and pumps while also providing the capability of digitally controlling such devices.

It should be understood that the invention is not limited to the exact details of construction shown and described herein for obvious modifications will occur to persons skilled in the art.

I claim the following:

1. A system for digitally controlling a plurality of electrically operative devices, the system comprising:
   a plurality of field controllers each having its respective output connected in circuit with a device for controlling the operation thereof;
   a control unit removably located from, and connected to the field controllers for communicating simultaneously therewith on a two-wire loop;
   respective means located at each electrically operated device for sensing its operational status; and
   means connecting each status sensing means to a respective field controller for subsequently communicating to the control unit, the status of the device.

2. The subject matter of claim 1 wherein the device is a valve, and wherein the field controller includes relay means responsive to a digital code from the control unit, the relay means having first and second poles, connected in circuit with a valve motor, for operating the motor in three modes, namely, open, close and stop.

3. The subject matter set forth in claim 2 wherein at least one field controller has mode programming means connected thereto for selectively preventing a connected device from changing operational status states without first passing through a "stop" state.

4. The subject matter of claim 1 wherein the device is a pump, and further wherein the field controller includes relay means responsive to a digital code from the control unit, the relay means having first and second poles, connected in circuit with a pump motor, for operating the motor in two modes, namely start and stop.

5. The subject matter of claim 1 wherein the device is a valve and wherein the field controller includes relay means responsive to the control unit, the relay means having:
- a first relay wiper normally closed with a respective first relay contact and normally open with a respective second relay contact;
- a second relay wiper normally closed with a respective third relay contact and normally open with a respective fourth relay contact;
- means connecting first and third relay contacts to a first potential;
- means connecting the first and second relay wipers together;
- means connecting the wipers to a second potential through a first circuit path including:
  - a first manually operable switch for interrupting the path therethrough, when activated;
  - a second manually operable switch for completing a circuit therethrough;
  - a first coil connected at a first end to the second switch and at a second end to a second potential;
- a second circuit path connected at a first end thereof to a junction between the first and second switches, the path including:
  - a third manually operable switch for completing a circuit therethrough;
  - a second coil connected at a first end to the third switch and at a second end to the second potential;
- whereby in a first relay state current flows through a preselected path when its respective manually operable switch is closed;
- first and second contact sets respectively connected in parallel with the second and third manually operable switches, said contact sets being closed in response to energization of a respective first or second coil;
- a third relay contact connected to a junction point between the second manually operable switch and the first coil;
- a fourth relay contact connected to a junction point between the third manually operable switch and the second coil;
- whereby in a second relay state current flows between the third relay contact to the first coil, causing the first contact set to close and maintain energization of the first coil;
- and further whereby in a third relay state current flows between the fourth relay contact to the second coil causing the second contact set to close and maintain energization to the second coil;
- and still further whereby a fourth relay state exists where said first and second relay wipers assume positions at their respective second and fourth contacts whereby the first and second coils are deenergized.

6. The subject matter set forth in claim 1 wherein the device is a pump and wherein the field controller includes relay means responsive to the control unit, the relay means having:
- a first relay wiper normally closed with a respective first relay contact;
- a second relay wiper normally closed with a respective second relay contact;
- means connecting first and second relay contacts to a first potential;
- means connecting the wipers to a second potential through a circuit path including:
  - a first manually operable switch for interrupting the path therethrough, when actuated;
  - a second manually operable switch for completing a circuit therethrough;
  - a coil connected at a first end to the second switch and at a second end to a second potential;
- whereby in a first relay state current flows through a path when the second manually operable switch is closed;
- a set of contacts connected in parallel with the second manually operable switch, said contacts being closed in response to energization of the coil;
- a third relay contact connected to a junction point between the second manually operable switch and the coil;
- whereby in a second relay state current flows between the third relay contact to the coil causing the contact set to close and maintain energization of the coil.

7. The subject matter of claim 2 together with manually operable switching means connected between the relay means and the valve motor for locally overriding the stop mode of the motor to an open mode.

8. The subject matter set forth in claim 2 together with manually operable switching means connected between the relay means and the valve motor for locally overriding the stop mode of the motor to a close mode.

9. The subject matter set forth in claim 2 together with manually operable switching means connected between the relay means and the valve motor for locally overriding the open or close mode of the motor to a stop mode.

10. The subject matter set forth in claim 4 together with manually operable switching means connected between the relay means and the pump motor for locally overriding the stop mode of the motor to a start mode.

11. The subject matter set forth in claim 4 together with manually operable switching means connected between the relay means and the pump motor for locally overriding the start mode of the motor to a stop mode.

12. A control circuit having relay means for achieving remote and local control of remotely located coils, the circuit comprising:
- a first relay wiper normally closed with a respective first relay contact;
- a second relay wiper normally closed with a respective second relay contact;
- means connecting first and second relay contacts to a first potential;
- means connecting the first and second relay wipers together;
- means connecting the wipers to a second potential through a first circuit path including:
  - a first manually operable switch for interrupting the path therethrough, when activated;

a second manually operable switch for completing a circuit therethrough;

a first coil connected at a first end to the second switch and at a second end to a second potential;

a second circuit path connected at a first end thereof to a junction between the first and second switches, the path including:

a third manually operable switch for completing a circuit therethrough;

a second coil connected at a first end to the third switch and at a second end to the second potential;

whereby in a first relay state current flows through a preselected path when its respective manually operable switch is closed;

first and second contact sets respectively connected in parallel with the second and third manually operable switches, said contact sets being closed in response to energization of a respective first or second coil;

a third relay contact connected to a junction point between the second manually operable switch and the first coil;

a fourth relay contact connected to a junction point between the third manually operable switch and the second coil;

whereby in a second relay state current flows between the third relay contact to the first coil, causing the first contact set to close and maintain energization of the first coil;

and further whereby in a third relay state current flows between the fourth relay contact to the second coil causing the second contact set to close and maintain energization to the second coil;

and still further a fourth relay state exists whereby both the wipers are disconnected from the first and second relay contacts thereby interrupting current flow to the energized first coil or second coil providing a "stop" control feature.

* * * * *